(12) United States Patent
McNutt et al.

(10) Patent No.: US 7,039,281 B2
(45) Date of Patent: May 2, 2006

(54) BUFFER TUBES FOR FIBER OPTIC CABLES

(75) Inventors: Christopher W. McNutt, Woodstock, GA (US); Jeffrey H. Mumm, Marietta, GA (US)

(73) Assignee: Essex Group, Inc., Ft. Wayne, IN (US)

( * ) Notice: Subject to any disclaimer, the term of this patent is extended or adjusted under 35 U.S.C. 154(b) by 0 days.

(21) Appl. No.: 10/659,139

(22) Filed: Sep. 10, 2003

(65) Prior Publication Data

US 2005/0041940 A1  Feb. 24, 2005

(51) Int. Cl.
*G02B 6/44* (2006.01)
(52) U.S. Cl. ................................. 385/100; 385/100
(58) Field of Classification Search ......... 385/100–114
See application file for complete search history.

(56) References Cited

U.S. PATENT DOCUMENTS 4,798,445 A * 1/1989 Yamamoto et al. ......... 385/143
5,574,816 A    11/1996 Yang et al.
6,650,815 B1 * 11/2003 Hawtof et al. ............. 385/128
2003/0228116 A1  12/2003 Davis et al.

FOREIGN PATENT DOCUMENTS

EP    1 115 017 A1    11/2001

OTHER PUBLICATIONS

Lorene Baccaro, et al., "Characterization of alternate resins for fiber optic loose tubes," Proceedings of the 61st Annual Convention of the Wire Association International, Atlanta, Georgia (Nov. 1991) and Charleston, SC (Apr. 1991), pp. 145-150.

* cited by examiner

*Primary Examiner*—Khiem Nguyen
(74) *Attorney, Agent, or Firm*—Rader, Fishman & Grauer PLLC

(57) ABSTRACT

A buffer tube for use in a fiber optic cable is disclosed. The buffer tube has a flexural modulus greater than about 180 kpsi and less than about 370 kpsi, which results in a buffer tube having good crush resistance and flexibility. A particularly useful buffer tube material is an alloy of polypropylene and polyphenylene oxide, which may contain solid fillers.

4 Claims, 1 Drawing Sheet

BUFFER TUBES FOR FIBER OPTIC CABLES

FIELD OF THE INVENTION

This invention generally relates to voice, video and data communication cables. More particularly, the invention relates to communication cables containing optical fibers. Even more particularly, this invention relates to buffer tubes for optical fiber cables.

BACKGROUND OF THE INVENTION

Cables containing optical fibers are used to transmit information, including voice and data signals, over long distances. They can be grouped into three main categories, which are distinguished by the location of the optical fibers within the cable. For example, in loose tube fiber optic cables, the optical fibers lie in one or more buffer tubes that are stranded about an elongated central strength member. Each of the buffer tubes usually includes a water-blocking material, such as a gel, that prevents moisture intrusion. In cases where the fiber count is less than the maximum number than can be stranded about the central strength member, the loose tube designs may include one or more flexible filler rods. The filler rods, which are typically fabricated from solid or cellular polymers, are wrapped about the central strength member and help minimize gaps between the central strength member and an outer protective covering or polymeric jacket.

Other fiber optic cable designs include monotube and slotted core cables. In monotube cables, the optical fibers are contained within a central buffer or core tube, which contains a water-blocking agent. In slotted core cables, the optical fibers reside in channels or grooves that have been formed on a surface of a rod-shaped polymeric core. The grooves typically follow a helical path along the surface of the core, which reduces compressive and tensile forces on the optical fibers whenever the cable is twisted, stretched, bent or compressed. The helical path traversed by the grooves may reverse direction at regular intervals along the cable's longitudinal axis, which further reduces the forces acting on the optical fibers. In addition to a central strength member and a water-blocking agent, which is disposed in each of the grooves, slotted core cables usually include a buffer tube that covers the slotted core. Both monotube and slotted core cables also include an outer protective covering or polymeric jacket.

Each of the fiber optic cable designs—loose tube, monotube, slotted core—may include other components, including reinforcing yarns and fibers, rip cords, and additional water-blocking materials (hot melts, water swellable powders, etc.). The fiber optic cables may also include helically wrapped tapes, corrugated armor and similar layers that help protect the optical fibers within the cable.

The buffer tube or core provides the primary protection for the optical fiber. As a result, the buffer tubes should exhibit good resistance to compressive, tensile and twisting forces (i.e., crush resistance) while maintaining adequate flexibility over a wide range of temperatures. Other desirable properties include low cost and low moisture sensitivity, as well as good heat resistance, dimensional stability (e.g., low coefficient of thermal expansion) and chemical resistance.

Conventional buffer tube designs include single layers of polypropylene (PP), polyethylene (PE), copolymers of polyethylene and polypropylene, including nucleated polypropylene and polyethylene (n-PP) copolymers, polyamides (PA) such as nylon 12, polybutylene terephthalate (PBT) and polycarbonate (PC). Other buffer tube designs may include multiple layers of these materials, such as a layer of PBT disposed on a layer of polycarbonate (PC).

Though useful, none of these materials is completely satisfactory. For example, PBT exhibits good crush resistance and is perhaps the most widely used material for buffer tubes. However, PBT has marginal flexibility, exhibiting a flexural modulus in excess of about 370 kpsi at room temperature. Though PBT can be treated to make it more flexible, such treatments increase its cost, making it less attractive for buffer tube applications. Additionally, PBT is susceptible to hydrolysis, which results in a loss of strength following exposure to moisture. Polyamides are also susceptible to hydrolysis and tend to be hygroscopic, which negatively impacts their mechanical and electrical properties and their dimensional stability.

Polyethylene, polypropylene and copolymers of PE and PP (n-PP) each have a flexural modulus less than about 180 kpsi and therefore exhibit good flexibility. However, these materials generally possess poor crush and kink resistance, making them less useful for buffer tube applications. As compared to PBT, polyolefins such as PE, PP and n-PP exhibit lower tensile, flexural and compressive strength, and lower thermal resistance. Furthermore, PE, PP and many of the copolymers of PE and PP undergo post-extrusion shrinkage, which may result in an increase in excess fiber length (ratio of optical fiber length to buffer tube length) over PBT. Increases in excess fiber length may lead to increased signal attenuation.

The present invention is directed to overcoming, or at least reducing the effects of one or more of the problems set forth above.

SUMMARY OF THE INVENTION

The present invention provides a buffer tube for use in a fiber optic cable, which is made of a polymeric material that exhibits crush resistance comparable to PBT resins, and provides flexibility comparable to polyolefinic materials such as n-PP. One measure of this balance between crush resistance and flexibility is flexural modulus. Thus, one aspect of present invention provides a buffer tube comprised of a polymeric material having a flexural modulus greater than about 180 kpsi at room temperature and having a flexural modulus less than about 370 kpsi at room temperature.

A particularly useful polymeric material for buffer tubes, which exhibits the requisite crush resistance and flexibility, is an alloy (blend) of polypropylene and polyphenylene oxide (PP-PPO). Unlike many materials used in buffer tubes, PP-PPO alloys do not undergo significant post-extrusion shrinkage, which results in less signal attenuation than buffer tubes made using, for example, polyethylene, polypropylene or copolymers of polyethylene and polypropylene. Like polyamides, PP-PPO alloys exhibit good chemical and thermal resistance, but do not undergo substantial hydrolytic degradation.

Still another aspect of the present invention provides a cable for transmitting a signal. The cable includes at least one optical fiber for transmitting the signal, at least one buffer tube for receiving the at least one optical fiber, and an outer protective jacket, which is disposed around the at least one buffer tube. The buffer tube is comprised of an alloy of polypropylene and polyphenylene oxide.

BRIEF DESCRIPTION OF THE DRAWINGS

FIG. 1 is a view of an aspect of the communication cables and methods for making and using the same according to the invention, in which:

FIG. 1 shows a cutaway section of a loose tube fiber optic cable.

FIG. 1 illustrates a specific aspect of the invention and is a part of the specification. Together with the following description, the Figure demonstrates and explains the principles of the invention and is a view of only particular—rather than complete—portions of the invention.

DETAILED DESCRIPTION OF THE INVENTION

Figure 1:
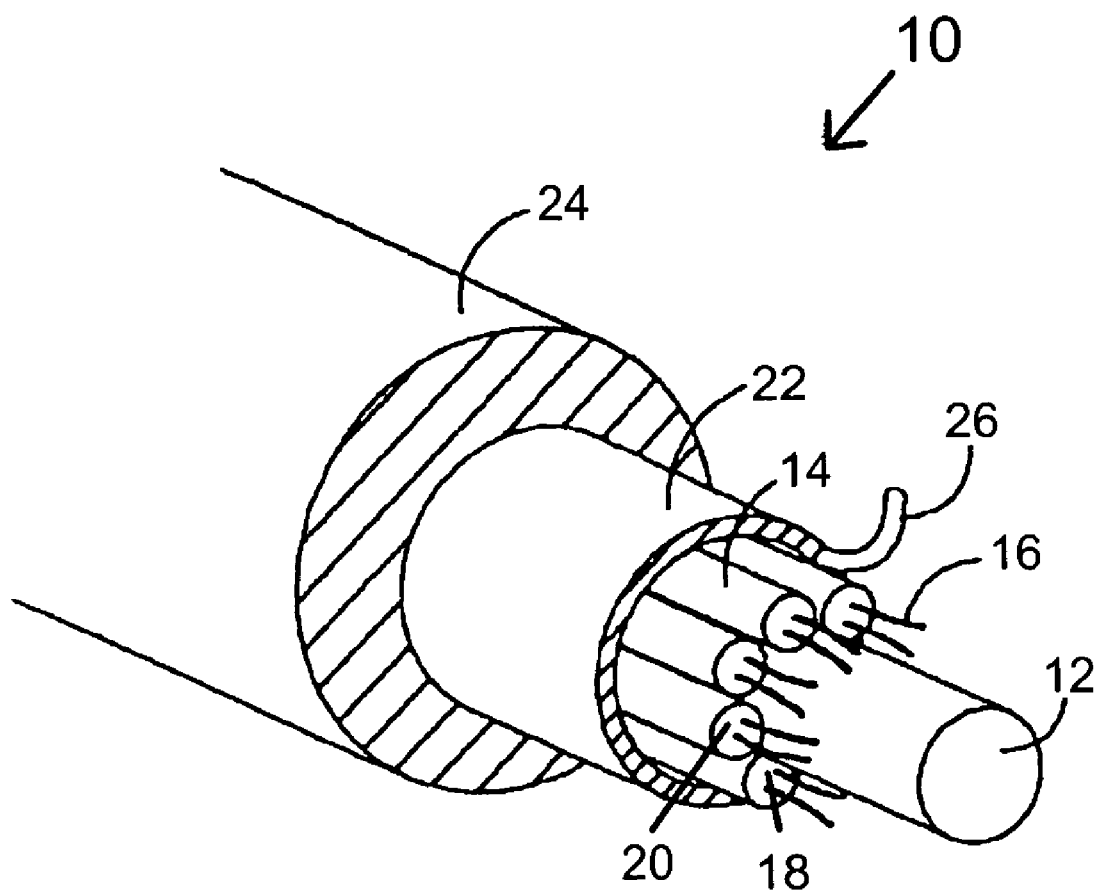

The following description provides specific details in order to provide a thorough understanding of the invention. The skilled artisan, however, would understand that the invention can be practiced without employing these specific details. Indeed, the present invention can be practiced by modifying the illustrated system and method and can be used in conjunction with apparatus and techniques conventionally used in the industry. For example, the invention is described below for optical fiber cables, but could be modified for any other type of communications cable.

The FIGURE shows a cutaway section of a loose tube fiber optic cable 10. The cable includes an elongated central strength member 12 and a plurality of buffer tubes 14, which are stranded about the central strength member 12. Each of the buffer tubes 14 contain optical fibers 16, which transmit information such as voice and data signals. The gap between individual optical fibers 16 and an inner surface 18 of each of the buffer tubes 14 is filled with a water-blocking gel 20, which limits moisture intrusion into the interior of the buffer tubes 14. The fiber optic cable 10 includes a reinforcing layer 22, which is disposed on the buffer tubes 14 and is typically comprised of woven yarn and the like. As can be seen in the Figure, the cable 10 also includes an outer protective covering or jacket 24, which can be made of a tough polymeric material, such as polyvinyl chloride (PVC). A ripcord 26, which can be located within the reinforcing layer 22 or adjacent to the buffer tubes 14, runs along the length of the length of the cable 10 and provides access to the optical fiber during or following installation of the cable 10. The cable 10 may include additional protective layers, including metallic armor, which are disposed about the buffer tubes 14 and the central strength member 12.

The buffer tubes 14 are made of an alloy of polypropylene and polyphenylene oxide (PP-PPO), which provides significant advantages over conventional buffer tube materials. In addition to exhibiting chemical and heat resistance that is similar to conventional buffer tube materials, PP-PPO alloys provide crush resistance and flexibility that are comparable, respectively, to PBT and polyolefins (e.g., polyethylene, polypropylene, PE-PP copolymers including n-PP).

It appears that PP-PPO alloys are able to achieve a good balance between crush resistance and flexibility because they exhibit a flexural modulus between that of PBT and polyolefinic materials. For example, an unfilled PP-PPO alloy exhibits a flexural modulus (at room temperature) of about 235 kpsi, whereas under the same conditions, PBT exhibits a flexural modulus of about 377 kpsi and n-PP exhibits a flexural modulus of about 180 kpsi. More generally, the buffer tubes 14 can be made of other polymeric materials that exhibit a flexural modulus greater than about 180 kpsi, but less than about 377 kpsi, as long as such materials also meet the requisite properties for buffer tubes 14 discussed above, which include chemical and heat resistance, dimensional stability, moisture insensitivity, etc.

The polypropylene—polyphenylene oxide alloy may be unfilled or filled (e.g., contain glass fiber, inorganic particles such as silica, talc, etc.) and may contain antioxidants, processing aids, and the like. The PP-PPO alloys can be made into buffer tubes 14 using any technique that is suitable for processing thermoplastic resins. For example, the PP-PPO alloys may be mixed under heat and pressure to liquefy the resin, followed by extrusion through an annular die to form the tube 14. Useful PP-PPO alloys can be obtained from GE under the trade name NORYL PPX.

The loose tube fiber optic cable 10 depicted in the Figure is for illustrative purposes only and is not meant to limit the invention in any way. Thus, the disclosed PP-PPO alloy buffer tubes may be used in any fiber optic cable, including monotube and slotted core fiber optic cables, and in hybrid cables that include optical fibers and metallic conductors.

The above description is intended to be illustrative and not restrictive. Many embodiments and many applications besides the example provided would be apparent to those of skill in the art upon reading the above description. The scope of the invention should therefore be determined, not with reference to the above description, but should instead be determined with reference to the appended claims, along with the full scope of equivalents to which such claims are entitled. The disclosures of any articles and references, including any patent applications and publications, are hereby incorporated by reference in their entirety for all purposes.

We claim:

1. A cable for transmitting a signal, the cable comprising:
  at least one optical fiber for transmitting the signal;
  at least one buffer tube for receiving the at least one optical fiber, the buffer tube comprised of an alloy of polypropylene and polyphenylene oxide, wherein the alloy is blended with glass fiber.

2. A cable for transmitting a signal, the cable comprising:
  at least one optical fiber for transmitting the signal;
  at least one buffer tube for receiving the at least one optical fiber, the buffer tube comprised of an alloy of polypropylene and polyphenylene oxide; and
  an outer jacket disposed around the at least one buffer tube; wherein the alloy is blended with glass fiber.

3. A cable for transmitting a signal, the cable comprising:
  at least one optical fiber for transmitting the signal;
  at least one buffer tube for receiving the at least one optical fiber, the buffer tube comprised of an alloy of polypropylene and polyphenylene oxide,wherein the alloy is filled, contains an antioxidant contains a processing aid, or a combination thereof.

4. A cable for transmitting a signal, the cable comprising:
  at least one optical fiber for transmitting the signal;
  at least one buffer tube for receiving the at least one optical fiber, the buffer tube comprised of an alloy of polypropylene and polyphenylene oxide, wherein the buffer tube has a flexural modulus at room temperature ranging from about 180 kpsi to about 370 kpsi.

* * * * *

UNITED STATES PATENT AND TRADEMARK OFFICE
CERTIFICATE OF CORRECTION

| | | |
|---|---|---|
| PATENT NO. | : 7,039,281 B2 | Page 1 of 1 |
| APPLICATION NO. | : 10/659139 | |
| DATED | : May 2, 2006 | |
| INVENTOR(S) | : Christopher McNutt et al. | |

It is certified that error appears in the above-identified patent and that said Letters Patent is hereby corrected as shown below:

Cover Page, Block (73) Assignee, "Essex Group, Inc., Ft. Wayne, IN (US)" should read --Superior Essex Communications LP, Atlanta, GA (US)--.

Signed and Sealed this

Fourteenth Day of August, 2007

JON W. DUDAS
*Director of the United States Patent and Trademark Office*